(No Model.)
W. BEATY.
DEVICE FOR FEEDING STOCK.
No. 373,877. Patented Nov. 29, 1887.
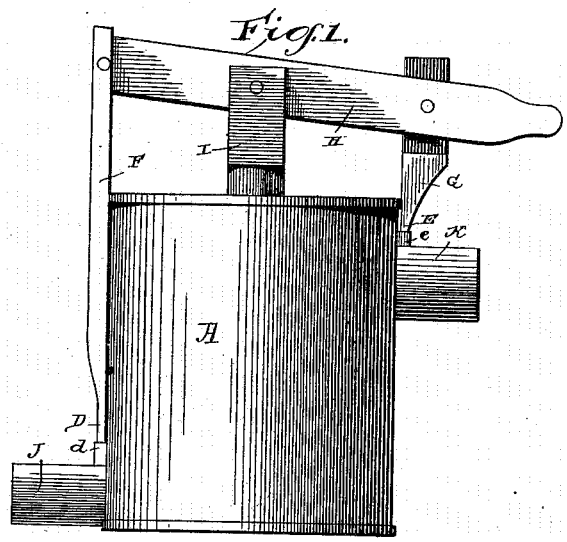
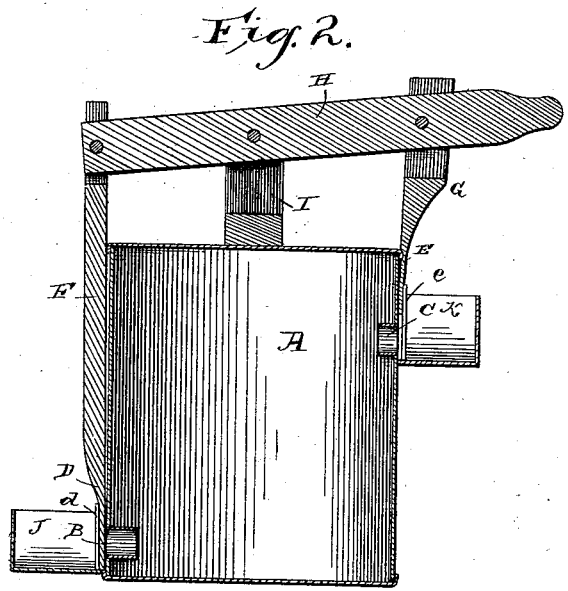
Witnesses
Henry G. Dieterich
R. W. Bishop
Inventor
William Beaty,
by C. A. Snow & Co.
Attorneys
N. PETERS, Photo-Lithographer, Washington, D. C.

UNITED STATES PATENT OFFICE.

WILLIAM BEATY, OF FINCHFORD, IOWA.

DEVICE FOR FEEDING STOCK.

SPECIFICATION forming part of Letters Patent No. 373,877, dated November 29, 1887.

Application filed August 18, 1887. Serial No. 247,297. (No model.)

*To all whom it may concern:*

Be it known that I, WILLIAM BEATY, a citizen of the United States, residing at Finchford, in the county of Black Hawk and State of Iowa, have invented new and useful Improvements in Devices for Feeding Stock, of which the following is a specification.

My invention relates to improvements in devices for feeding stock, and is especially adapted for feeding thick swill and water to hogs. It consists in certain novel features, hereinafter first fully described, and then pointed out in the claims.

In the accompanying drawings, which fully illustrate my invention, Figure 1 is a side elevation, and Fig. 2 is a central vertical section, of the same.

Referring to the drawings by letter, A designates a tank or reservoir, provided at its lower end on one side with the outlet-opening B and at its upper end, on the diametrically-opposite side, with an inlet-opening, C, as clearly shown. These openings are closed by valves D E, respectively, which slide vertically in guides d e, arranged on opposite sides of the openings. These valves are formed on or secured to the pivoted arms F G, depending from the operating-lever H, which is fulcrumed between said arms in the upper end of the bracket I on the upper end of the tank or reservoir. A trough, J, is provided on the side of the tank around the outlet-opening B, and a similar trough, K, is provided at the upper end of the tank around the inlet-opening C.

The operation of the device is as follows: When it is desired to fill the tank or reservoir, the lever H is turned to the position shown in Fig. 2, thereby raising the valve E and opening the inlet-opening C and depressing the valve D and closing the outlet-opening B. The feed is then passed into the trough K, and flows from the same into the tank through the inlet-opening C. The lever and valves are then turned to the position shown in Fig. 1, closing the inlet-opening and opening the outlet-opening, when the feed will pass into the trough J, in which easy access to it may be had by the stock.

It will be seen that I have provided a very simple device in which the feed is stored, and by which scattering of the same over the ground is prevented.

Having thus described my invention, what I claim, and desire to secure by Letters Patent, is—

1. The combination, with the tank having the outlet-opening at its lower end and the inlet-opening at its upper end on the diametrically-opposite side, of the lever fulcrumed on the top of the tank and the arms depending therefrom and provided with valves to close the inlet and outlet openings, substantially as specified.

2. The combination of the tank having the trough J on one side and the discharge-opening communicating therewith and the trough K on the opposite side and inlet-opening communicating therewith, the lever H above the tank, and the valves adapted to open and close the openings in the tank and connected to opposite ends of the lever, whereby a movement of the latter will cause one of the openings in the tank to be opened and the other simultaneously closed, for the purpose set forth, substantially as described.

In testimony that I claim the foregoing as my own I have hereto affixed my signature in presence of two witnesses.

WILLIAM BEATY.

Witnesses:
D. AUFEAR KNAPP,
FRANK HONEYWELL.